US005772924A

United States Patent [19]

Hayashi et al.

[11] Patent Number: 5,772,924

[45] Date of Patent: Jun. 30, 1998

[54] COMPOSITE CONDUCTIVE POWDER AND CONDUCTIVE FILM FORMED FROM THE POWDER

[75] Inventors: Takao Hayashi, Yamaguchi; Katsuhiko Yoshimaru, Saitama, both of Japan

[73] Assignee: Mitsui Mining & Smelting Co., Ltd., Tokyo, Japan

[21] Appl. No.: 806,501

[22] Filed: Feb. 27, 1997

Related U.S. Application Data

[63] Continuation of Ser. No. 449,240, May 24, 1995, abandoned.

[30] Foreign Application Priority Data

Jun. 14, 1994 [JP] Japan .................................... 6-132117

[51] Int. Cl.[6] .............................. H01B 1/08; C09C 1/36; B05D 5/12

[52] U.S. Cl. ................................. 252/520.1; 252/519.12; 252/519.15; 252/520.2; 252/520.21; 106/436; 106/438; 106/441; 106/450; 106/455; 106/286.4; 106/287.19; 427/126.3

[58] Field of Search .................................... 252/518, 520, 252/519.12, 519.15, 520.1, 520.2, 520.21; 106/436, 438, 441, 450, 455, 286.9, 287.19; 427/126.3

[56] References Cited

U.S. PATENT DOCUMENTS

| | | | |
|---|---|---|---|
| 4,052,339 | 10/1977 | Costin | 252/518 X |
| 4,937,148 | 6/1990 | Sato et al. | 252/518 X |
| 5,112,676 | 5/1992 | Cot et al. | 427/226 |
| 5,401,441 | 3/1995 | Robert et al. | 252/518 |
| 5,413,739 | 5/1995 | Coleman | 252/518 X |
| 5,578,248 | 11/1996 | Hattori et al. | 252/518 |

FOREIGN PATENT DOCUMENTS

| | | |
|---|---|---|
| 60-186416 | 9/1985 | Japan . |
| 63-11519 | 1/1988 | Japan . |
| 63-259908 | 10/1988 | Japan . |
| 2-120374 | 5/1990 | Japan . |
| 5-201731 | 8/1993 | Japan . |
| 5-221639 | 8/1993 | Japan . |

*Primary Examiner*—Douglas J. McGinty
*Attorney, Agent, or Firm*—Kane, Dalsimer, Sullivan, Kurucz, Levy, Eisele and Richard, LLP

[57] ABSTRACT

Composite conductive powder comprises a calcined mixture of conductive powder mainly comprising indium oxide which contains at least one member selected from the group consisting of tin oxide, titanium oxide and zirconium oxide as a dopant and conductive powder mainly comprising tin oxide which contains at least one member selected from the group consisting of antimony oxide, tantalum oxide and niobium oxide as a dopant, and a conductive film is formed from the composite, conductive powder. The composite, conductive powder and the conductive film produced from the powder permit the reduction in the amounts of materials for the ITO film, in particular, indium which is an expensive material and the composite, conductive powder can simultaneously satisfy both requirements for high transparency and high conductivity even if it is used for the formation of films through the coating technique.

8 Claims, No Drawings

COMPOSITE CONDUCTIVE POWDER AND CONDUCTIVE FILM FORMED FROM THE POWDER

This application is a continuation of application Ser. No. 08/449,240, filed May 24, 1995, now abandoned.

BACKGROUND OF THE INVENTION (a) Field of the Invention

The present invention relates to composite, conductive powder and a conductive film formed from the powder, which have high transparency and excellent in conductivity. More particularly, the conductive film of the present invention is a film having high conductivity, high transparency to the light rays falling within the visible region and an ability of reflecting light rays falling within the infrared region and can be used, in particular, in various fields such as transparent electrodes for display elements (for instance, flat display-liquid crystal display elements and electroluminescence-display elements) and internal electrodes for solar batteries; infrared (or thermic) ray-reflecting parts, for instance, window glass for motorcars, aircrafts and various structures; parts related to copying machines which require charge-control such as charged rollers, photosensitive drums and toners; parts which require dust deposition-inhibitory properties such as CRT's (cathode ray tubes) or Braun tubes; and magnetic recording media such as optical disks, FD's and magnetic recording tapes.

Moreover, the composite, conductive powder of the present invention can easily be dispersed in and mixed with, for instance, paint and varnish, inks, emulsions and polymers, when putting into practical use. The powder ensures high transparency and excellent conductivity even when it is added to paint and varnish and then formed into a coated film.

(b) Description of the Prior Art

As materials for transparent conductive films, there have conventionally been known, for instance, antimony-doped tin oxide (ATO), aluminum-doped zinc oxide (AZO) and tin-doped indium oxide (ITO). Either of them is an n-type semiconductor and, in particular, an ITO film has a conductivity greater than that of an AZO film, has high transparency to the light rays falling within the visible region and can easily be patterned through an etching technique. Therefore, the ITO film has been widely used in various fields, for instance, transparent conductive films such as liquid crystal display elements and electroluminescence display elements.

As methods for preparing an ITO film, there have been known, for instance, vapor-deposition, sputtering, spraying and coating methods. The vapor-deposition and sputtering methods have been put into practical use since they can produce ITO films having a relatively low resistance in good reproducibility. However, the vapor-deposition and sputtering methods require the use of expensive film-forming installation and thus suffer from a problem of high production cost and poor mass-productivity. Moreover, the materials for ITO are very expensive by themselves and the cost accounting for the conductive film occupies the majority of the overall cost accounting for the final product provided with the film. For this reason, there has intensively been desired for the development of a cheap transparent conductive film and a method for preparing the same which permits a reduction in the production cost and an improvement in the mass-productivity.

On the other hand, the spraying and coating methods have been known as methods which permit the production of such conductive films at a low cost and in high mass-productivity. However, the spraying method includes a thermal decomposition step wherein materials are sprayed at a high temperature and accordingly, suffers from a problem of poor uniformity and low reproducibility of the quality and thickness of the resulting films. On the other hand, the coating method which utilizes a process for printing with paint and varnish makes patterning of the films to be formed easy and ensures a high yield of ITO of an expensive material and therefore, it is superior to other methods from the various viewpoints, such as film-forming area and film-forming temperature. However, the method requires the use of fine particles, which have a high specific surface area and are hence quite susceptible to oxidation, and correspondingly, is greatly influenced by the surface oxidation of the particles. This results in a marked reduction in the carrier electron density within the surface layer of the resulting film. Accordingly, the coating method has not yet provided any ITO film having conductivity on the order of from 50 to 100Ω/□ which can be produced by other methods such as sputtering method.

As powdery conductive materials for transparent conductive films mainly comprising indium oxide, there have conventionally been used those disclosed in, For instance, Japanese UnExamined Patent Publication (hereunder referred to as "J. P. KOKAI") Nos. Sho 60-186416, Sho 63-11519, Hei 2-120374, Hei 5-201731 and Hei 5-221639, but either of these patents includes $In_2O_3$ in an amount of not less than 80 mole %. It is common that a dopant such as Sn has generally been added to powdery conductive materials to improve the carrier electron density thereof due to the action of the resulting donor and to thus improve the conductivity of the materials. However, if the amount of added Sn is too high (this leads to a decrease in the relative amount of $In_2O_3$), neutral combined defects are formed, the carrier electron mobility is reduced due to the scattering at grain boundaries and the scattering by ionic impurities and the conductivity of the material is correspondingly reduced. For this reason, a large amount of $In_2O_3$ is incorporated into the material as has been described above.

SUMMARY OF THE INVENTION

Accordingly, it is an object of the present invention to provide highly composite, conductive powder and a conductive film in which the content of, in particular, indium as an expensive ingredient among those for the ITO film can be reduced and which can simultaneously satisfy requirements for high transparency and high conductivity even when the powder is used in the coating method.

The inventors of this invention have conducted various investigations on means capable of improving the carrier electron density on the surface of conductive powder even if the indium content thereof is reduced, have found out that composite, conductive powder which permits the achievement of the foregoing object of the present invention can be obtained by mixing conductive powder mainly comprising indium oxide which contains at least one dopant with conductive powder mainly comprising tin oxide which contains at least one dopant (preferably, in a mixing ratio falling within a specific range) and then calcining the resulting powder mixture and thus have completed the present invention.

According to an aspect of the present invention, there is provided composite, conductive powder which comprises a calcined mixture of conductive powder mainly comprising indium oxide which contains at least one member selected from the group consisting of tin oxide, titanium oxide and zirconium oxide as a dopant and conductive powder mainly comprising tin oxide which contains at least one member selected from the group consisting of antimony oxide, tantalum oxide and niobium oxide as a dopant.

According to another aspect of the present invention, there is provided a conductive film which is a film formed from the aforementioned composite, conductive powder by the use of a film-forming method selected from the group consisting of, for instance, vapor-deposition, sputtering, spraying and coating methods or a coated film obtained by adding the composite, conductive powder to paint and varnish and then formed into a film through coating.

DESCRIPTION OF THE PREFERRED EMBODIMENTS

The composite, conductive powder and conductive film of the present invention will hereunder be described in more detail.

The composite, conductive powder of the present invention exhibits improved conductivity as compared with the conventional conductive powder mainly comprising indium oxide. The detailed mechanism of such improvement, in the conductivity, of the composite, conductive powder according to the present invention has not yet been clearly elucidated, but would be assumed to be as follows.

The composite, conductive powder of the present invention is one obtained by calcining the foregoing mixture of fine powder mainly comprising indium oxide (such as ITO fine powder) and fine powder mainly comprising tin oxide (such as ATO fine powder). When calcining the mixture, a trace amount of a dopant diffuses from one of the fine powdery components (fine powdery component A) to the surface of fine particles constituting the other fine powdery component (fine powdery component B) (in respect of, for instance, Sb, it would be assumed that $Sb^{5+}$ is replaced with $In^{3+}$ to give a donor), this leads to coexistence of the dopant of the fine powdery component A (for instance, Sn or Sb) originally present on the fine particles constituting the component A with a trace amount of the dopant which transfers, through diffusion, from the fine powdery component B (for instance, Sb or Sn) to the component A, i.e., coexistence of both dopants (dopant A and dopant B, for instance, Sn and Sb) on the surface of the fine particles of the fine powdery component A and vice versa and thus the carrier electron density is increased. These different kinds of conductive powdery components are kept at a gentle contact state or a mixed condition during the calcination. Therefore, the dopant present in one of the fine powdery component (for instance, the component B) does not excessively diffuse to the surface of the other fine powdery component (for instance, the component A) unlike a powder mixture in a consolidated condition, any excess concentration of the dopants on the surface of each fine particle is accordingly inhibited and thus the carrier electron mobility is not reduced, at all, due to scattering of the carrier electrons by ionized impurities. Moreover, the fine powder is improved in its crystallizability and the scattering of carrier electrons by the grain boundaries is assumed to be reduced since the fine powdery mixture is calcined. In addition, it would be assumed that both of the dopants A and B improve the carrier electron density and the carrier mobility for some reason.

In the composite, conductive powder of the present invention, at least one member selected from the group consisting of tin oxide, titanium oxide and zirconium oxide is used as a dopant for the powder mainly comprising indium oxide, while at least one member selected from the group consisting of antimony oxide, tantalum oxide and niobium oxide is used as a dopant for the powder mainly comprising tin oxide. These dopants have been selected on the basis of the investigations on various dopants while taking into consideration the valency of each metal ion and the radius thereof.

In addition, when the composite, conductive powder of the present invention is added to paint and varnish and then formed into a coated film, the film must satisfy the requirement for high transparency. For this reason, the primary particle size of the fine powder is desirably not more than ½ time the wavelength of the visible light rays (400 to 800 nm) and is desirably improved in the dispersibility in a resin.

The following materials can be used as the fine conductive powder mainly comprising indium oxide (fine conductive powder A) and the fine conductive powder mainly comprising tin oxide (fine conductive powder B) used in the preparation of the composite, conductive powder according to the present invention, respectively. The fine conductive powder A comprises indium oxide and at least one dopant selected from the group consisting of tetravalent Sn, Ti and Zr in an amount ranging from 0.1 to 10% by weight on the basis of the weight of the indium oxide and has a particle size of the $D_{90}$ fraction in the particle size distribution preferably ranging from 0.01 to 5 $\mu$m, a specific surface area preferably ranging from 5 to 100 $m^2/g$ and a volume resistivity preferably ranging from $10^{-3}$ to $10^3$ $\Omega \cdot$ cm. If the content of the dopant is less than 0.1% by weight, the effect expected through the addition of the dopant is insufficient, while if it exceeds 10% by weight, any marked effect is not expected any more and on the contrary, the conductivity of the composite powder is sometimes adversely affected by the addition thereof.

On the other hand, the fine conductive powder B comprises tin dioxide and at least one dopant selected from the group consisting of pentavalent Sb, Nb and Ta in an amount ranging from 0.1 to 10% by weight on the basis of the weight of the tin dioxide and has a particle size of the $D_{90}$ fraction in the particle size distribution preferably ranging from 0.01 to 5 $\mu$m, a specific surface area preferably ranging from 5 to 100 $m^2/g$ and a volume resistivity preferably ranging from $10^{-1}$ to $10^3$ $\Omega \cdot$ cm. If the content of the dopant is less than 0.1% by weight, the effect expected through the addition of the dopant is insufficient, while if it exceeds 10% by weight, any marked effect is not expected any more and on the contrary, the conductivity of the composite powder is sometimes adversely affected by the addition thereof.

The term "particle size of the $D_{10}$, $D_{50}$ and $D_{90}$ fractions in the particle size distribution" herein used means the particle size of fine particles constituting each fraction which corresponds to the amount of the fine particles of 10%, 50% or 90% cumulated in the order of increasing diameter in the particle size distribution.

The fine conductive powder B used for preparing the composite, conductive powder of the present invention can be prepared by a method comprising the steps of separately preparing an alkaline or acidic solution containing a stannic salt in a concentration preferably ranging from 0.5 to 10 mole/l and at least one compound selected from the group consisting of compounds of pentavalent Sb, Nb and Ta in an amount corresponding to 0.1 to 10% by weight of elemental Sb, Nb and/or Ta on the basis of the weight of the stannic salt reduced to that of tin dioxide and a solution for neutralizing the Sb, Nb and/or Ta-containing stannic salt solution, then simultaneously and continuously introducing these solutions into a reaction vessel (through, for instance, the bottom of the reaction vessel); stirring these two solutions at a high speed immediately after the simultaneous introduction thereof to thus ensure instantaneous achievement or acceleration of uniform mixing of these solutions, uniform nucleation and dispersion of fine co-precipitates while maintaining the pH value of the reaction system in the reaction vessel at a desired constant level ranging from 2 to 12 to thus continuously give co-precipitates having a fine and sharp particle size distribution; continuously discharging, from the reaction vessel (through, for instance, the upper portion of the vessel), the solution obtained after the reaction and the co-precipitates formed during the reaction in the form of a slurry; subjecting the slurry to a solid-liquid separation treatment to recover the co-precipitates; drying them; and thereafter calcining the co-precipitates at a temperature ranging from 300° to 800° C. in the air or an inert gas or weakly reducing atmosphere to thus impart conductivity to the co-precipitates.

In the foregoing preparation method, the Sb, Nb and/or Ta compound-containing stannic salt solution may be either alkaline or acidic solution and the stannic salt, Sb compound, Nb compound and/or Ta compound are not restricted to specific ones, respectively. For instance, if the Sb, Nb and/or Ta compound-containing stannic salt solution is an acidic solution, the stannic salt may be, for instance, stannic chloride, stannic sulfate, stannic nitrate or stannic acetate; and the Sb, Nb and Ta compounds may be, for instance, halides such as chlorides and fluorides and sulfates of these elements. These Sb, Nb and/or Ta compounds may be added to the stannic salt solution in the form of an aqueous or alcoholic solution to give an intended Sb, Nb and/or Ta compound-containing stannic salt solution practically used. Alternatively, if the Sb, Nb and/or Ta compound-containing stannic salt solution is an alkaline solution, the stannic salt may be, for instance, sodium stannate or potassium stannate, while the Sb, Nb and Ta compounds may be, for instance, halides such as chlorides and fluorides, sulfates of these elements and $K_2NbOF_5 \cdot H_2O$. These Sb, Nb and/or Ta compounds may be added to the stannic salt solution in the form of an aqueous or alcoholic solution to give an intended Sb, Nb and/or Ta compound-containing stannic salt solution practically used.

On the other hand, if the Sb, Nb and/or Ta compound-containing stannic salt solution is an acidic solution, an aqueous solution of, for instance, sodium hydroxide, potassium hydroxide, ammonia or sodium carbonate may be used as the solution for neutralizing the Sb, Nb and/or Ta compound-containing stannic salt solution, while if the Sb, Nb and/or Ta compound-containing stannic salt solution is an alkaline solution, a dilute solution of, for instance, hydrochloric acid, sulfuric acid, nitric acid or acetic acid may be used as the neutralization solution. The concentration of the neutralization solution is preferably 0.5 to 5 times that of the Sb, Nb and/or Ta compound-containing stannic salt solution. If the concentration thereof is too low, the amount of the waste liquor vainly increases and the expense required for the post-treatment of the waste liquor, while if it is too high, it is difficult to maintain the pH at a desired constant level, this becomes a cause of the formation of composite powder having a broad particle size distribution and problems of, for instance, deposition of scale on the electrodes of a pH meter or the like are apt to arise.

The slurry prepared by the foregoing method is subjected to a solid-liquid separation treatment (for instance, filtration), followed by washing, recovery of the co-precipitates thus formed, drying, and subsequent calcination at a temperature ranging from 300° to 800° C., preferably 450° to 700° C. in the air or an inert gas or weakly reducing atmosphere. If the calcination temperature is less than 300° C., the dopant insufficiently forms donors and tin dioxide is not sufficiently crystallized and accordingly, has a tendency to have insufficient conductivity. On the other hand, if it exceeds 800° C., the co-precipitates undergo sintering to give large coarse particles and when the resulting product is added to paint and varnish and then formed into a coating film, the resulting coating film has unacceptably low transparency.

The calcination atmosphere used in the foregoing production method may be air, an inert gas atmosphere such as an $N_2$, He, Ne, Ar or Kr atmosphere or a weakly reducing gas atmosphere comprising either of these inert gases to which a reducing gas such as $H_2$ and/or CO is added in an amount of not more than 20% by volume, preferably 0.1 to 5% by volume. In this respect, if the concentration of the reducing gas to be added to the inert gas atmosphere exceeds 20% by volume, the reduction of the tin compound proceeds to such an extent that tin dioxide having a composition beyond the stoichiometrical ratio is formed, the product is abruptly oxidized when removed from the calcination system and sometimes ignites in the air to thus cause sintering. Moreover, the resulting tin dioxide is not desirable from the viewpoint of color tone since it is colored dark blue or brown due to excess reduction.

The fine conductive powder A can likewise be prepared by a method similar to the foregoing method for preparing the fine conductive powder B.

The composite, conductive powder of the present invention can be prepared according to the method detailed below. First of all, the foregoing fine conductive powder B and fine conductive powder A are admixed in a weight ratio preferably ranging from 3:7 to 7:3, more preferably about 1:1. The mixing of these fine conductive powders may be carried out by any known dry mixer such as a mortar, a kneader and a blender; any known pulverizer such as a ball mill, a pin mill and a sand mill; or by forming a slurry of the mixture and then mixing in a wet pulverization-mixer such as a ball mill, a high speed mixer, a paint shaker and a beads mill.

The fine conductive powder thus mixed together in the form of a slurry is dried and then calcined at a temperature ranging from 300° to 800° C., preferably 450° to 700° C. in the air or an inert gas or weakly reducing gas atmosphere. If the calcination temperature is less than 300° C., the diffusion of the dopant to the counterpart of these powdery components is insufficient, the product is not sufficiently crystallized and accordingly has insufficient conductivity. On the other hand, if the temperature exceeds 800° C., the resulting powder undergoes sintering to give large coarse particles and when the resulting powder is added to paint and varnish and then formed into a coating film, the resulting coating film has unacceptably low transparency.

The calcination atmosphere used in the foregoing method for preparing the composite, conductive powder may likewise be air, an inert gas atmosphere such as an $N_2$, He, Ne, Ar or Kr atmosphere or a weakly reducing gas atmosphere comprising either of these inert gases to which a reducing gas such as $H_2$ and/or CO is added in an amount of not more than 20% by volume, preferably 0.1 to 5% by volume. In this respect, if the concentration of the reducing gas to be added to the inert gas atmosphere exceeds 20% by volume, the reduction excessively proceeds to such an extent that tin dioxide and indium oxide each having a composition beyond the corresponding stoichiometrical ratio are formed, the product is abruptly oxidized when removed from the calcination system and sometimes ignites in the air to thus cause sintering. Moreover, the resulting powder is not desirable from the viewpoint of color tone since it is colored dark gray tinged with blue due to excess reduction. Moreover, indium oxide forms, for instance, $InSn_4$ having a low melting point and accordingly, the resulting powder undergoes cohesion to thus form large and coarse particles.

As has been clear from the foregoing description and as will be clear from or detailed in the description of the following Examples, the composite, conductive powder of the present invention preferably satisfies the following relations if the rate of indium oxide present in the composite, conductive powder is represented by x %, that of tin oxide is represented by y %, that of the dopant comprising at least one member selected from the group consisting of tin oxide, titanium oxide and zirconium oxide (hereunder referred to as "dopant A") is represented by a % and that of the dopant comprising at least one member selected from the group consisting of antimony oxide, tantalum oxide and niobium oxide (hereunder referred to as "dopant B") is represented by b %:

$$x+y+a+b=100$$

$$x:a=90:10\sim99.9:0.1$$

$$y:b=90:10\sim99.9:0.1$$

$$(x+a):(y+b)=3:7\sim7:3$$

The composite, conductive powder of the present invention preferably has a particle size of the $D_{90}$ fraction in the particle size distribution ranging from 0.01 to 5 μm, a specific surface area ranging from 5 to 100 $m^2/g$ and a volume resistivity ranging from $10^{-4}$ to $10^2\Omega\cdot$ cm. This is because, if the particle size of the $D_{90}$ fraction in the particle size distribution is less than 0.01 μm or the specific surface area exceeds 100 $m^2/g$, the powder mixture is apt to cause sintering even when it is calcined at a low temperature and thus forms coarse particles during the calcining treatment. Moreover, if the particle size of the $D_{90}$ fraction in the particle size distribution exceeds 5 μm or the specific surface area is less than 5 $m^2/g$, the resulting composite, conductive powder comprises coarse particles and is apt to impair the transparency of the thin film formed therefrom when the powder is added to paint and varnish and then formed into such a thin film. If the volume resistivity exceeds $10^2$ $\Omega\cdot$ cm, the resulting powder does not ensure desired conductivity practically acceptable, while the lower limit of the volume resistivity, i.e., $10^{-4}\Omega\cdot$ cm corresponds to the level which has been able to be achieved by ant technique presently available.

The present invention will now be explained in more detail below with reference to the following non-limitative working Examples and Reference Examples.

EXAMPLE 1

(1) To 2 l of an aqueous solution prepared by dissolving 124.07 g of indium metal in nitric acid and then removing the remaining free nitric acid, there was added a solution obtained by dissolving 57.6 g of $SnCl_4$ in 200 ml of 36% HCl to give an Sn-containing In aqueous solution. Separately, a 25% aqueous ammonia solution was prepared as a neutralization solution. Then the Sn-containing In aqueous solution was fed to a reaction vessel, which was stirred at a high speed on the order of 8000 rpm, at a constant flow rate of 46 ml/min using a constant rate pump, through the bottom of the vessel, while the neutralizer was also fed to the vessel in a flow rate such that the pH value of the content of the vessel was stabilized at 4.5. The reaction time (residence time) was set at about 45 minutes and the temperature of the reaction vessel was maintained at 30° C. during the reaction. The resulting slurry was continuously discharged through the upper portion of the reaction vessel, then filtered, washed, dried and subsequently calcined, in a rotary kiln, at 600° C. for one hour in the atmospheric environment. The resulting fine powder is hereunder referred to as "powder A".

(2) An Sb-containing Sn aqueous solution was prepared by dissolving 50.4 g of $SbCl_4$ in 200 ml of 36% HCl , adding 864 g of a 60% by weight $SnCl_4$ solution and then adding pure water to a final volume of 2 l. Separately, a 25% aqueous ammonia solution was prepared as a neutralizer. Then the Sb-containing Sn aqueous solution was fed to a reaction vessel, which was stirred at a high speed on the order of 8000 rpm, at a constant flow rate of 40 ml/min using a constant rate pump, through the bottom of the vessel, while the neutralization solution was also fed to the vessel in a flow rate such that the pH value of the content of the vessel was stabilized at 3.0. The temperature of the reaction vessel was controlled to 60° C. The resulting slurry was continuously discharged through the upper portion of the reaction vessel, then filtered, washed, dried and subsequently calcined, in a rotary kiln, at 450° C. for one hour in the atmospheric environment. The resulting fine powder is hereunder referred to as "powder B".

(3) The powder A and the powder B were mixed in a mortar of agate in a mixing ratio (by weight) of 25:75, 30:70, 50:50, 70:30 or 75:25 and the resulting mixture was calcined, in a rotary kiln, at 600° C. for one hour in the atmospheric environment. Each powder thus obtained was pressure-molded, under a pressure of 2 ton/$cm^2$, to give each corresponding specimen and physical properties thereof were determined. More specifically, the volume resistivity of the specimen was measured using a resistance meter Loresta AP available from Mitsubishi Petrochemical Co., Ltd., the specific surface area thereof was determined according to the BET method using Canta Sorp available from Cantachrome Company and the particle size distribution thereof was determined using Microtrack available from Lees & Northrap Instrument Company. In this respect, each powder was pre-treated prior to the particle size distribution measurement by adding the powder to an aqueous solution containing sodium hexametaphosphate as a dispersant and then applying ultrasonics to the dispersion for 10 minutes to give a suspension which was used in the determination of particle size distribution as a sample. The results of the evaluation are summarized in the following Table 1.

In addition, each powder was incorporated into paint and varnish and then applied onto a polyester film having a thickness of 100 μm to give a coated film having a thickness of 1 μm. The transmittance of the coated film to the entire light rays and the haze value thereof were determined by Haze Meter NDH-1001DP available from Nippon Denshoku Industries, Ltd. In this connection, the paint and varnish used had the composition detailed in Table 4, then each powder was dispersed therein for 20 hours in Paint Shaker (RC-5000 available from Red devil Company) and it was coated on the film with a bar coater. These results of the evaluation are also summarized in Table 1. Each measured value includes the influence of the polyester film having a thickness of 100 μm. In addition, the values in the parenthesis corresponds to the value observed for the film alone.

Incidentally, characteristic properties of the powder A and the powder B are also listed in Table 1 as Reference Examples 1 and 2, respectively.

EXAMPLE 2

The powder A and the powder B were treated in the same manner used in Example 1 except that 50 g of the powder A and 50 g of the powder B were blended and that the blend was calcined at 500°, 700° and 800° C. to give composite, powdery products and the characteristic properties thereof were evaluated in the same manner used in Example 1. The results thus obtained are summarized in Table 1.

EXAMPLE 3

The powder A and the powder B were treated in the same manner used in Example 1 except that the powder A and the powder B were blended in a mixing ratio (by weight) of 30:70, 50:50 or 70:30, that the blend was calcined in an $N_2$ gas atmosphere and that the calcination was performed at 450° C. to give composite, powdery products and the characteristic properties were evaluated in the same manner used in Example 1. The results thus obtained are summarized in Table 1.

EXAMPLE 4

The same procedures used in Example 3 were repeated except that the calcination temperature was changed to 550° C. to give composite, powdery products and they were inspected for characteristic properties in the same manner used in Example 3. The results thus obtained are summarized in Table 1.

EXAMPLE 5

The powder A and the powder B were treated in the same manner used in Example 1 except that a mixed gas atmosphere comprising $N_2$ (300 ml/min)+$H_2$ (5 ml/min) was used as the atmosphere for the calcination and that the calcination was performed at 450° C. to give composite, powdery products and the characteristic properties were evaluated in the same manner used in Example 1. The results thus obtained are summarized in Table 1.

EXAMPLE 6

The powder A and the powder B were treated in the same manner used in Example 5 except that the powder A and the powder B were blended in a mixing ratio (by weight) of 30:70, 50:50 or 70:30 and that the calcination was carried out at 550° C. to give composite, powdery products and the characteristic properties were evaluated in the same manner used in Example 5. The results of the evaluation are summarized in Table 1.

EXAMPLE 7

(1) The same procedures used in the item (1) of Example 1 were repeated except that 79.1 g of $TiCl_4$ was substituted for 57.6 g of $SnCl_4$ to give fine powder. The resulting fine powder is herein referred to as "powder C".

(2) The same procedures used in the item (2) of Example 1 were repeated except that 8.9 g of $NbCl_5$ was dissolved in 100 ml of 36% HCl instead of dissolving 50.4 g of $SbCl_3$ in 200 ml of 36% HCl to give fine powder. The resulting fine powder is herein referred to as "powder D".

(3) The same procedures used in the item (3) of Example 1 were repeated except that the powder C and the powder D were blended in a mixing ratio (by weight) of 30:70, 50:50 or 70:30 and that the calcination was carried out at 450° C. in a mixed gas atmosphere comprising $N_2$ (300 ml/min)+$H_2$ (5 ml/min) to give composite, powdery products and the characteristic properties were evaluated in the same manner used in Example 1. The results of the evaluation are summarized in Table 2.

Incidentally, characteristic properties of the powder C and the powder D are also listed in Table 2 as Reference Examples 3 and 4, respectively.

EXAMPLE 8

(1) The same procedures used in the item (1) of Example 1 were repeated except that 63.0 g of $ZrCl_4$ was substituted for 57.6 g of $SnCl_4$ and that the calcination was carried out at 450° C. in a mixed gas atmosphere comprising $N_2$ (300 ml/min)+$H_2$ (5 ml/min) to give fine powder. The resulting fine powder is herein referred to as "powder E".

(2) The same procedures used in the item (2) of Example 1 were repeated except that 12.1 g of $TaCl_5$ was dissolved in 100 ml of 36% HCl instead of dissolving 50.4 g of $SbCl_3$ in 200 ml of 36% HCl and that the calcination was carried out at 450° C. in a mixed gas atmosphere comprising $N_2$ (300 ml/min)+$H_2$ (5 ml/min) to give fine powder. The resulting fine powder is herein referred to as "powder F".

(3) The same procedures used in the item (3) of Example 1 were repeated except that the powder E and the powder F were blended in a mixing ratio (by weight) of 30:70, 50:50 or 70:30 and that the calcination was carried out at 450° C. in a mixed gas atmosphere comprising $N_2$ (300 ml/min)+$H_2$ (5 ml/min) to give composite, powdery products and the characteristic properties thereof were evaluated in the same manner used in Example 1. The results of the evaluation are summarized in Table 3.

Incidentally, characteristic properties of the powder E and the powder F are also listed in Table 3 as Reference Examples 5 and 6, respectively.

TABLE 1

| | | | | Characteristic Properties of Powder | | | | | Properties of Coated Film | | |
|---|---|---|---|---|---|---|---|---|---|---|---|
| Ex. No. | Mixing Ratio B/A | Calcination Atmosphere | Calcination Temperature (°C.) | Volume Resistivity (Ω · cm) | Specific Surface Area ($m^2$/g) | Particle Size of the Following Fractions $D_{10}$ | $D_{50}$ | $D_{90}$ (μm) | Transmittance to Entire Light (%) | Haze Value (%) | Resistivity Ω/□ |
| 1* | 0/100 | — | — | $2.1 \times 10^6$ | 32.7 | 0.4 | 0.8 | 1.8 | — | — | — |
| 2* | 100/0 | — | — | $2.8 \times 10^6$ | 38.5 | 0.3 | 0.7 | 1.8 | — | — | — |
| 1 | 75/25 | air | 600 | $1.2 \times 10^6$ | 32.6 | 0.4 | 1.0 | 2.0 | 81.5 (91.3) | 8.9 (7.2) | $1.2 \times 10^4$ |
| 1 | 70/30 | air | 600 | $6.3 \times 10^{-1}$ | 32.6 | 0.4 | 0.9 | 1.9 | 80.8 (90.6) | 8.7 (7.1) | $8.1 \times 10^3$ |
| 1 | 50/50 | air | 600 | $3.5 \times 10^{-2}$ | 31.8 | 0.4 | 1.0 | 2.0 | 82.4 (92.5) | 7.2 (5.5) | $2.9 \times 10^3$ |
| 1 | 30/70 | air | 600 | $4.7 \times 10^{-1}$ | 30.7 | 0.4 | 1.0 | 2.1 | 83.2 (93.5) | 6.6 (5.0) | $7.3 \times 10^3$ |
| 1 | 25/75 | air | 600 | $8.3 \times 10^{-1}$ | 31.1 | 0.4 | 1.0 | 2.1 | 84.1 (93.7) | 6.3 (4.8) | $9.1 \times 10^3$ |

TABLE 1-continued

| | | | | Characteristic Properties of Powder | | | | | Properties of Coated Film | | |
|---|---|---|---|---|---|---|---|---|---|---|---|
| Ex. No. | Mixing Ratio B/A | Calcination Atmosphere | Calcination Temperature (°C.) | Volume Resistivity (Ω · cm) | Specific Surface Area ($m^2$/g) | Particle Size of the Following Fractions $D_{10}$ | $D_{50}$ | $D_{90}$ (μm) | Transmittance to Entire Light (%) | Haze Value (%) | Resistivity Ω/□ |
| 2 | 50/50 | air | 500 | $1.2 \times 10^{0}$ | 32.8 | 0.4 | 1.0 | 1.9 | 84.0 (94.2) | 7.9 (5.9) | $2.1 \times 10^{4}$ |
| 2 | 50/50 | air | 700 | $7.6 \times 10^{-1}$ | 31.2 | 0.4 | 1.1 | 2.1 | 82.3 (92.4) | 7.2 (5.6) | $6.3 \times 10^{3}$ |
| 2 | 50/50 | air | 800 | $2.1 \times 10^{0}$ | 28.5 | 0.5 | 1.3 | 2.4 | 81.5 (91.7) | 8.3 (6.8) | $3.8 \times 10^{4}$ |
| 3 | 70/30 | $N_2$ | 450 | $5.3 \times 10^{-1}$ | 34.5 | 0.4 | 0.7 | 1.8 | 83.6 (93.7) | 8.1 (6.3) | $7.6 \times 10^{3}$ |
| 3 | 50/50 | $N_2$ | 450 | $1.2 \times 10^{-1}$ | 33.6 | 0.4 | 0.8 | 1.8 | 83.5 (93.4) | 7.9 (6.3) | $4.2 \times 10^{3}$ |
| 3 | 30/70 | $N_2$ | 450 | $6.9 \times 10^{-1}$ | 33.3 | 0.4 | 0.8 | 1.8 | 84.0 (93.9) | 7.2 (5.7) | $9.3 \times 10^{3}$ |
| 4 | 70/30 | $N_2$ | 550 | $4.8 \times 10^{-1}$ | 33.3 | 0.4 | 0.8 | 1.8 | 83.3 (93.6) | 6.9 (5.3) | $3.9 \times 10^{3}$ |
| 4 | 50/50 | $N_2$ | 550 | $1.1 \times 10^{-2}$ | 34.1 | 0.4 | 0.8 | 1.9 | 83.1 (93.4) | 7.5 (5.4) | $1.1 \times 10^{3}$ |
| 4 | 30/70 | $N_2$ | 550 | $3.5 \times 10^{-1}$ | 33.8 | 0.4 | 0.8 | 1.9 | 84.1 (93.6) | 6.5 (4.9) | $5.6 \times 10^{3}$ |
| 5 | 75/25 | $N_2/H_2$ | 450 | $7.3 \times 10^{-1}$ | 34.3 | 0.4 | 0.7 | 1.8 | 84.3 (93.9) | 6.7 (5.1) | $5.3 \times 10^{3}$ |
| 5 | 70/30 | $N_2/H_2$ | 450 | $3.8 \times 10^{-3}$ | 33.1 | 0.4 | 0.7 | 1.8 | 83.7 (93.6) | 6.6 (5.0) | $3.3 \times 10^{2}$ |
| 5 | 50/50 | $N_2/H_2$ | 450 | $5.8 \times 10^{-4}$ | 33.4 | 0.4 | 0.7 | 1.9 | 84.1 (94.2) | 6.7 (5.3) | $4.7 \times 10^{1}$ |
| 5 | 30/70 | $N_2/H_2$ | 450 | $7.1 \times 10^{-4}$ | 34.5 | 0.4 | 0.8 | 1.9 | 84.7 (94.2) | 6.6 (4.8) | $5.0 \times 10^{1}$ |
| 5 | 25/75 | $N_2/H_2$ | 450 | $2.9 \times 10^{-2}$ | 33.5 | 0.4 | 0.8 | 1.9 | 84.5 (94.0) | 6.6 (4.8) | $3.8 \times 10^{3}$ |
| 6 | 70/30 | $N_2/H_2$ | 550 | $6.5 \times 10^{-2}$ | 34.3 | 0.5 | 0.8 | 1.9 | 82.4 (92.6) | 7.1 (5.4) | $5.2 \times 10^{3}$ |
| 6 | 50/50 | $N_2/H_2$ | 550 | $9.3 \times 10^{-3}$ | 32.1 | 0.4 | 0.9 | 1.9 | 84.4 (93.9) | 6.8 (5.1) | $3.5 \times 10^{2}$ |
| 6 | 30/70 | $N_2/H_2$ | 550 | $5.2 \times 10^{-2}$ | 33.9 | 0.4 | 0.9 | 1.9 | 83.9 (94.1) | 6.6 (5.0) | $8.9 \times 10^{2}$ |

*Reference Example

TABLE 2

| | | | | Characteristic Properties of Powder | | | | | Properties of Coated Film | | |
|---|---|---|---|---|---|---|---|---|---|---|---|
| Ex. No. | Mixing Ratio B/A | Calcination Atmosphere | Calcination Temperature (°C.) | Volume Resistivity (Ω · cm) | Specific Surface Area ($m^2$/g) | Particle Size of the Following Fractions $D_{10}$ | $D_{50}$ | $D_{90}$ (μm) | Transmittance to Entire Light (%) | Haze Value (%) | Resistivity Ω/□ |
| 3* | 0/100 | — | — | $1.5 \times 10^{1}$ | 35.1 | 0.3 | 0.7 | 1.9 | — | — | — |
| 4* | 100/0 | — | — | $5.3 \times 10^{1}$ | 27.5 | 0.4 | 0.9 | 2.0 | — | — | — |
| 7 | 70/30 | $N_2/H_2$ | 450 | $6.7 \times 10^{-1}$ | 28.1 | 0.4 | 1.1 | 2.1 | 80.9 (91.0) | 8.7 (7.2) | $9.8 \times 10^{3}$ |
| 7 | 50/50 | $N_2/H_2$ | 450 | $7.2 \times 10^{-2}$ | 30.3 | 0.4 | 1.0 | 2.1 | 82.1 (92.1) | 8.1 (6.5) | $2.1 \times 10^{3}$ |
| 7 | 30/70 | $N_2/H_2$ | 450 | $6.9 \times 10^{-2}$ | 30.9 | 0.4 | 1.0 | 2.1 | 82.5 (92.5) | 6.7 (5.1) | $1.9 \times 10^{3}$ |

*Reference Example

TABLE 3

| | | | | Characteristic Properties of Powder | | | | | Properties of Coated Film | | |
|---|---|---|---|---|---|---|---|---|---|---|---|
| Ex. No. | Mixing Ratio B/A | Calcination Atmosphere | Calcination Temperature (°C.) | Volume Resistivity (Ω · cm) | Specific Surface Area ($m^2$/g) | Particle Size of the Following Fractions $D_{10}$ | $D_{50}$ | $D_{90}$ (μm) | Transmittance to Entire Light (%) | Haze Value (%) | Resistivity Ω/□ |
| 5* | 0/100 | — | — | $8.5 \times 10^{-3}$ | 38.5 | 0.3 | 0.8 | 2.0 | — | — | — |
| 6* | 100/0 | — | — | $3.1 \times 10^{0}$ | 28.3 | 0.3 | 0.5 | 2.3 | — | — | — |
| 8 | 70/30 | $N_2/H_2$ | 600 | $9.8 \times 10^{-2}$ | 27.1 | 0.4 | 0.8 | 2.4 | 82.3 (92.4) | 7.9 (6.2) | $2.5 \times 10^{3}$ |
| 8 | 50/50 | $N_2/H_2$ | 600 | $2.3 \times 10^{-2}$ | 29.8 | 0.4 | 0.9 | 2.5 | 82.1 (92.4) | 7.3 (5.8) | $5.3 \times 10^{2}$ |
| 8 | 30/70 | $N_2/H_2$ | 600 | $1.2 \times 10^{-2}$ | 33.5 | 0.3 | 0.8 | 2.4 | 83.2 (93.5) | 6.9 (5.3) | $4.9 \times 10^{2}$ |

*Reference Example

TABLE 4

| Component | Amount Blended (g) |
|---|---|
| Powder of the Invention (having each mixing ratio) | 11.11 |
| Resin: Acrylic Resin (LR 167 available from Mitsubishi Rayon Co., Ltd.) | 6.04 |
| Solvent: toluene/butanol (70%/30%) | 7.85 |
| Total | 25.00 |

1) solid content: 42.5%; 2) PWC (pigment concentration): 80%
*The resin content of Resin LR 167 is 46%.

In the foregoing Examples, the present invention has been described while taking, as examples, the cases wherein one kind of powder mainly comprising indium oxide (fine conductive powder A) and one kind of powder mainly comprising tin oxide (fine conductive powder B) are used for simplifying the explanation, but the results identical to those discussed above can likewise be obtained even when using a combination of one kind of the fine conductive powder A and at least two kinds of the fine conductive powder B or a combination of at least two kinds of the fine conductive powder A and at least two kinds of the fine conductive powder B.

As has been discussed above in detail, the composite, conductive powder and the conductive film produced from the powder according to the present invention permit the reduction in the amounts of materials for the ITO film, in particular, indium which is an expensive material and the composite, conductive powder can simultaneously satisfy both requirements for high transparency and high conductivity even if it is used for the formation of films through the coating technique.

What is claimed is:

1. A composite conductive powder consisting essentially of a calcined product obtainable by calcination of a mixture of first conductive powder mainly comprising indium oxide which contains at least one member selected from the group consisting of tin oxide, titanium oxide and zirconium oxide as a dopant and a second conductive powder mainly comprising tin oxide which contains at least one member selected from the group consisting antimony oxide, tantalum oxide and niobium oxide as a dopant.

2. The composite, conductive powder of claim 1 wherein the powder satisfies the following relations:

$$x+y+a+b=100$$

$$x:a=90:10\sim99.9:0.1$$

$$y:b=90:10\sim99.9:0.1$$

$$(x+a):(y+b)=3:7\sim7:3$$

wherein x (%) represents the rate of indium oxide present in the composite, conductive powder, y (%) represents the rate of tin oxide, a (%) represents the rate of the dopant comprising at least one member selected from the group consisting of tin oxide, titanium oxide and zirconium oxide and b (%) represents the rate of the dopant comprising at least one member selected from the group consisting of antimony oxide, tantalum oxide and niobium oxide.

3. The composite, conductive powder of claim 1 wherein the powder has a particle size of the $D_{90}$, fraction in the particle size distribution ranging from 0.01 to 5 $\mu$m, a specific surface area ranging from 5 to 100 $m^2$/g and a volume resistivity ranging from $10^{-4}$ to $1.2\times10^{-1}$ Ω·cm, said calcination of mixture being carried out at a temperature of 450° C. to 700° C.

4. The composite, conductive powder of claim 2 wherein the first fine conductive powder mainly comprising indium oxide comprises indium oxide and at least one dopant selected from the group consisting of tetravalent Sn, Ti and Zr in an amount ranging from 0.1 to 10% by weight on the basis of the weight of the indium oxide.

5. The composite, conductive powder of claim 4 wherein the second fine conductive powder mainly comprising tin oxide has a particle size of the $D_{90}$ fraction in the particle size distribution preferably ranging from 0.01 to 5 $\mu$m, a specific surface area preferably ranging from 5 to 100 $m^2$/g and a volume resistivity preferably ranging from $10^{-4}$ to $1.2\times10^{-1}$ Ω·cm.

6. The composite, conductive powder of claim 2 wherein the second fine conductive powder mainly comprising tin oxide comprises tin dioxide and at least one dopant selected from the group consisting of pentavalent Sb, Nb and Ta in an amount ranging from 0.1 to 10% by weight on the basis of the weight of the tin dioxide.

7. The composite, conductive powder of claim 6 wherein the second fine conductive powder mainly comprising tin oxide has a particle size of the $D_{90}$ fraction in the particle size distribution preferably ranging from 0.01 to 5 $\mu$m, a specific surface area preferably ranging from 5 to 100 $m^2$/g and a volume resistivity preferably ranging from $10^{-4}$ to $1.2\times10^{-0}$ Ω·cm.

8. A conductive film formed from the composite, conductive powder as set forth in claim 1.

* * * * *